United States Patent [19]

Guzdar

[11] Patent Number: 4,533,289
[45] Date of Patent: Aug. 6, 1985

[54] SEALING AND LIQUID DISPLACEMENT SYSTEMS FOR A LINEAR POCKET FEEDER

[75] Inventor: Adi R. Guzdar, Sudbury, Mass.

[73] Assignee: Foster-Miller Associates, Inc., Waltham, Mass.

[21] Appl. No.: 386,256

[22] Filed: Jun. 8, 1982

[51] Int. Cl.³ .............................................. C10J 3/52
[52] U.S. Cl. ..................................... 414/217; 198/729
[58] Field of Search ................... 414/217, 290; 406/81, 406/168; 48/86 R; 422/219, 232; 198/727, 729; 55/256

[56] References Cited

U.S. PATENT DOCUMENTS

| | | | |
|---|---|---|---|
| 2,559,616 | 7/1951 | Hapman | 414/217 X |
| 2,564,599 | 8/1951 | Hapman | 198/727 X |
| 4,261,705 | 4/1981 | Li | 414/217 X |
| 4,379,670 | 4/1983 | Hanoosh | 414/217 |

FOREIGN PATENT DOCUMENTS 2736617 2/1979 Fed. Rep. of Germany ...... 414/290

Primary Examiner—Robert G. Sheridan
Attorney, Agent, or Firm—Wolf, Greenfield & Sacks

[57] ABSTRACT

An improved sealing and liquid displacement system for a continuous linear pocket feeder for feeding materials from a low pressure to a high pressure region, particularly for feeding coal in a coal conversion process. A dual sealing system including a sphincter followed by a moving labyrinth seal is provided downstream of the hopper from which the coal is fed into moving pockets formed between spaced pistons in the driving chain, and upstream of the unloading station where the materials are deposited in a pressurized vessel. The sphincter is provided with means for adjusting the diameter of the tube surrounding the pistons to form a continuous contact seal. The desired labyrinth seal is formed by providing a close clearance between the pistons and the sealing tube. Downstream of the unloading station, a liquid displacement and gas seal system is provided which serves to displace gas residing within the moving pockets using a displacing liquid. Typically, two transfer tanks are provided, both of which are filled with the displacing liquid above the level of the pistons. One tank is a high pressure tank which has a return to the unloading station, while the second is a low pressure tank disposed downstream of the high pressure tank which completes the removal of gas from the pockets and returns the gas to a lower pressure point in the feeder system.

16 Claims, 11 Drawing Figures

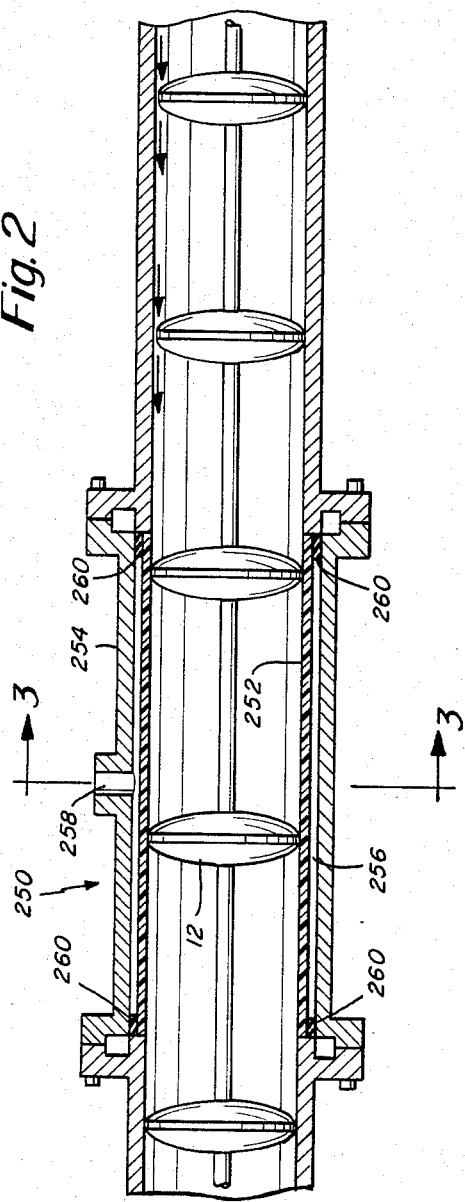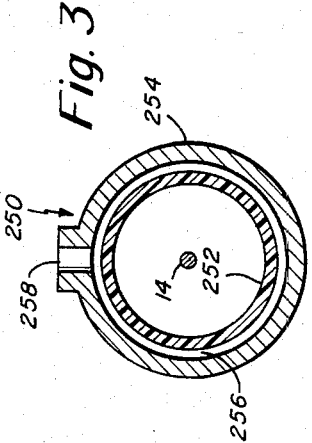

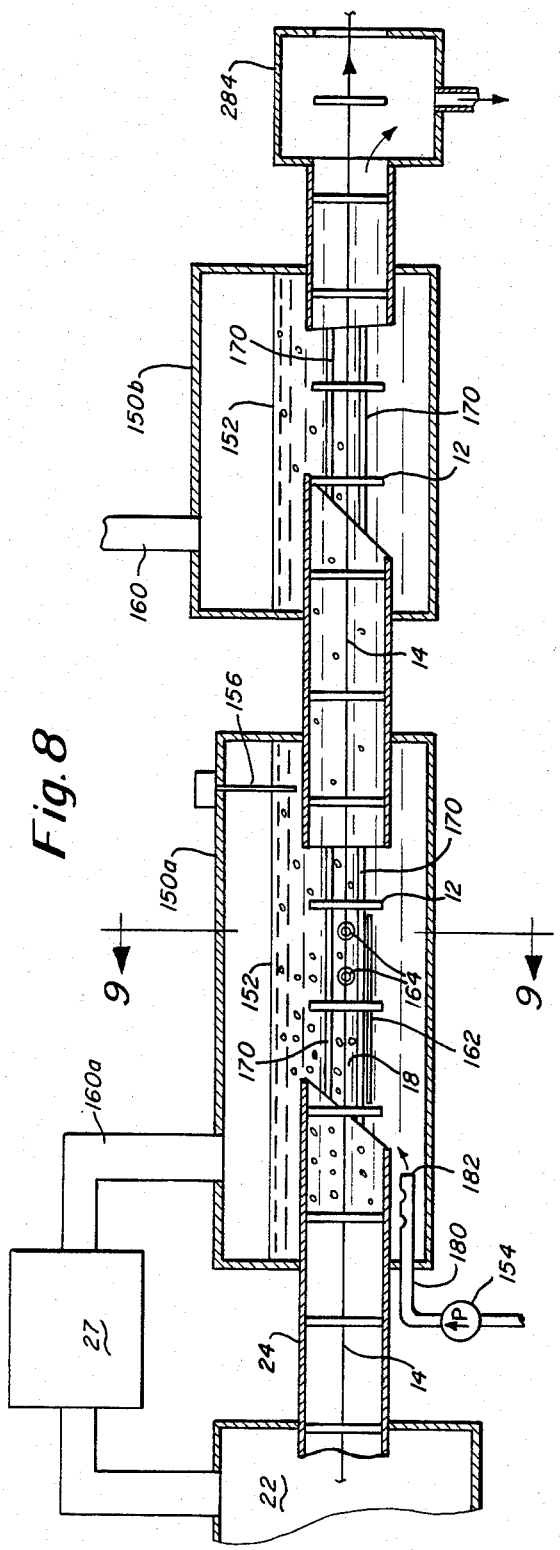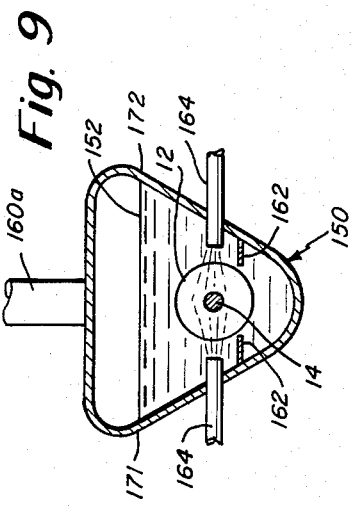

4,533,289

SEALING AND LIQUID DISPLACEMENT SYSTEMS FOR A LINEAR POCKET FEEDER

FIELD OF THE INVENTION

This invention relates to continuous feeders capable of feeding a variety of materials from a low pressure to a high pressure region, and more particularly relates to an improved continuous linear pocket feeder capable of feeding a wide variety of coal types and sizes to various gasification processes.

BACKGROUND OF THE INVENTION

The basic linear pocket feeder is a known device for introducing coarse dry granular solids into a vessel or reactor containing gas at a pressure of a few atmospheres or more. Such a device consists of a tube for conveying solids by means of a circulating chain of pistons fitting tightly in said tube, forming so-called pockets that move through the tube. Typically, solids are poured into a hopper over a slot in the horizontal tube. The pockets convey the solids to another slot or bottom opening in the tube connected to a pressurized receiver vessel, into which the solids fall. Examples of linear pocket feeders are illustrated in copending U.S. applications Ser. No. 166,151 now Pat. No. 4,379,670, and Ser. No. 254,779, now U.S. Pat. No. 4,410,429.

Such linear pocket feeders are often used to feed coal in coal conversion processes. Coal feeding is one of the critical steps common to all coal conversion processes such as gasification, liquification and fluidized bed conversion. Slurry pumps and lock hopper feed systems are the two systems currently available for feeding coat at high pressures. For those processes that do not require solvent or quench liquid, slurry systems impose a process thermodynamic penalty, and both lock hoppers and slurry pumps become expensive in construction and maintenance in large sizes and at high pressures. Advanced coal feeders which are capable of economically feeding dry coal continuously into the more advanced coal conversion processes are needed, particularly since the longer term trend with these processes seems to be to higher pressures and higher feed rates.

SUMMARY OF THE INVENTION

The principal object of the present invention is to improve upon the basic concepts of the linear pocket feeder to increase the efficiency of the system particularly for use in feeding coal to different types of conversion processes.

A more specific object of this invention is to improve the sealing system at the intake end of the feeder and the liquid displacement and gas sealing system downstream of the unloading station.

The sealing system between the hopper and the receiver vessel is provided with a dual sealing system including a sphincter to maintain a continuous contact seal followed by a moving labyrinth seal between the tube and the pistons to reduce the pressure that the sphincter seals from the high discharge pressure to a substantially lower value. Downstream from the receiver vessel the pockets enter a ported section surrounded by a high pressure vessel partially flooded with water to above the level of the tube. Here the pockets fill with water and the previously trapped gas is ducted back to the pressurized receiver vessel from whence it came. Thus, the gas is saved and the work required for introducing the solids into the pressurized space is supplied in effect by pumping water into the vessel for exchanging water and gas. A second, low pressure vessel may also be provided downstream of the high pressure vessel for removal of any remaining gas from the pockets. This gas is directed to a low pressure point in the feeder system. The water trapped in the pockets is transported through the tube and discharged to the atmosphere.

BRIEF FIGURE DESCRIPTION

The objects, advantages and features of this invention will be more clearly appreciated from the following detailed description taken in conjunction with the accompanying drawing in which:

FIG. 2 is a cross-sectional view of one embodiment of a dual sealing system of this invention;

FIG. 3 is a cross-sectional view taken along the section line 3—3 of FIG. 2;

FIG. 8 is a schematic cross-sectional drawing of the liquid displacement and gas sealing system of FIG. 1;

FIG. 9 is a cross-sectional view taken along the section line 9—9 in FIG. 8;

DETAILED DESCRIPTION OF THE PREFERRED EMBODIMENT

Figure 1:
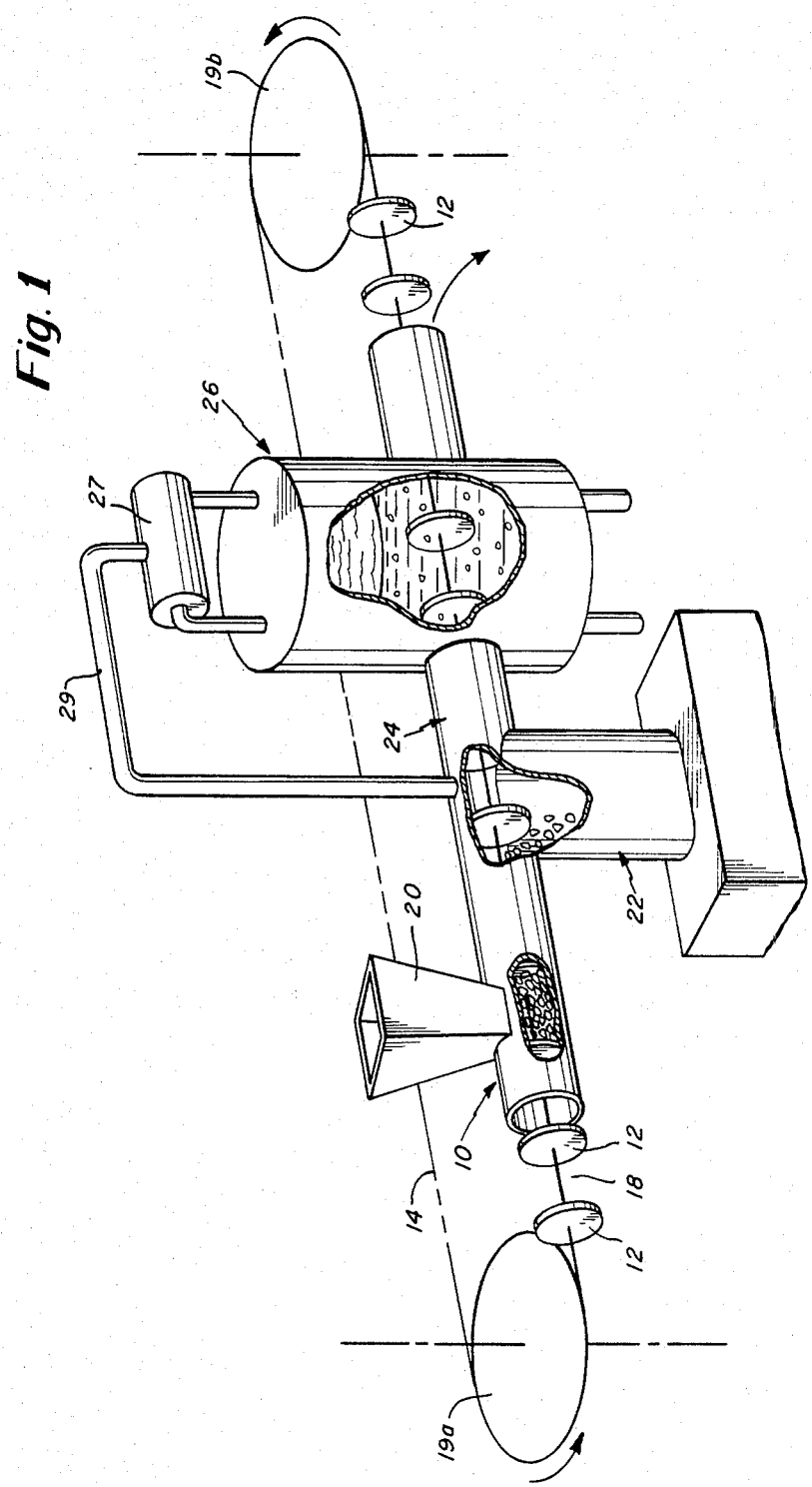
FIG. 1 is a schematic drawing of a linear pocket feeder.

The linear pocket feeder is shown schematically in FIG. 1. It includes a tubular conveyor 10 in which a series of sealing pistons 12 are connected together by a chain 14 to form pockets 18. The chain 14 is supported and driven by an idler sprocket 19a and drive sprocket 19b, all of which is shown schematically in FIG. 1. In the system shown, the pockets 18 are filled with coal from a hopper 20, carried to the high pressure unloading station 22 through a sealing tube 24, emptied, and then filled with water at the liquid displacement station 26 to displace pressurized gas filling the pockets back into the high pressure unloading station 22. The gas is returned to the unloading station 22 through the dryer 27 and duct 29.

Conventional linear pocket feeders rely on close clearance between solid (constant diameter) piston rings and the conveying tube to form a moving labyrinth seal. As the tube and rings wear, clearance and, hence, leakage increases. The improvements herein discloses cover a sphincter which is added upstream of the moving labyrinth seal to provide a continuous contact seal. The sphincter is typically disposed between hopper 20 and unloading station 22. The inner diameter or bore of the tube is adjusted so that there is contact with solid piston rings relatively independent of the pressure inside the tube. The bore is controlled by displacement means and not applied pressure exterior of the tube. Since there is clearance between the pistons and the sealing tube in the moving labyrinth seal, the frictional force on the piston-chain is not excessive, and if the clearance is below a calculable value, dependent on chain speed and trapped gas, then gas leakage upstream is low or zero. In addition, if gas pressure or leakage upstream of the sealing system is measured, this value can be used in the sealing systems to control the bore of the sphincter tube. Thus, the linear pocket feeder can be compensated to have acceptable leakage of gas over an extended period including substantial wear of piston rings and tubes.

FIGS. 2 and 3 show one embodiment of a sealing system for the linear pocket feeder capable of transporting granular material from the low pressure hopper to the high pressure unloading station 22 with zero gas leakage when the linear pocket feeder is both running and stopped, and with a built-in means for compensating for machine wear. The system includes a combination of the moving labyrinth seal with a contact seal called the sphincter 250.

The dynamic motion of the pistons 12 in the sealing tube acts as a pressure reducer. The pressure that the sphincter 250 has to seal against is significantly lower than the system pressure; typically 100-200 psi for a system pressure of 1000 psi. When the machine is new and the clearance is small, most of the pressure drop will occur across the first one or two pistons 12 approaching the high pressure dropout station. As the machine wears, and the clearance increases, this pressure drop will get distributed more uniformly across the sealing tube. With large clearances, all the pressure drop will occur across the sphincter 250.

The sphincter is designed to be adjustable in order to compensate for wear of the piston and the inner diameter of the sphincter tube.

Sphincter 250 includes an inner monolithic tube 252 disposed within an outer monolithic tube 254. Tube 252 is preferably composed of a low stiffness material, for example, ultra high molecular weight polyethylene, while tube 254 is formed of a rigid material similar to the material of which tube 24 is formed. Tube 254 is typically formed as an extension of tube 24 and is connected thereto at each end. Tubes 254 and 252 are coaxial and radially spaced from one another to form annular space 256 therebetween. Tube 254 completely encloses tube 252, and tube 254 is pressure sealed at each end 260 to the outside diameter of tube 252 to seal annular space 256. A port 258 is formed in tube 254 in communication with annular space 256, and port 258 is adapted to be coupled to a source of hydraulic or gas pressure. The interior surface of tube 252 is in sliding contact with pistons 12, and the adjustment of hydraulic or gas pressure within annular space 256 maintains the contact pressure between the interior of tube 252 and the seals on the periphery of the pistons. Thus, if the pressure within annular space 256 is increased, the diameter of tube 252 is decreased and the contact pressure between pistons 12 and tube 252 is increased, and vice-versa.

Figure 4:
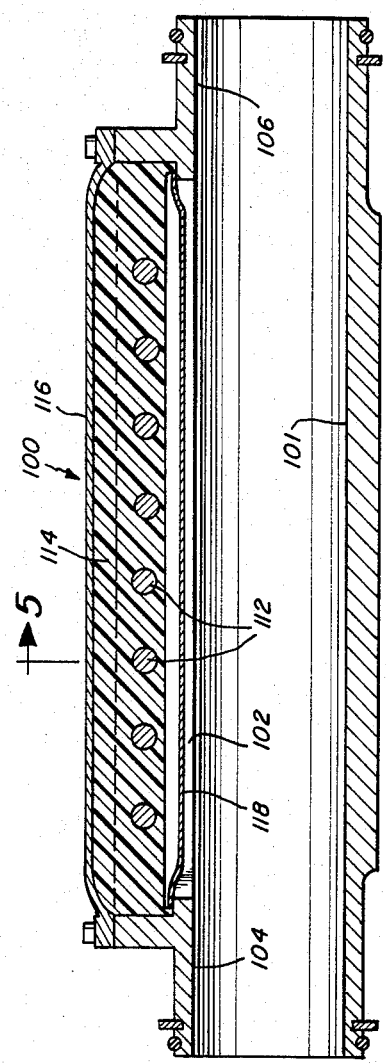
FIG. 4 is a cross sectional view of another form of sphincter which may be used in the dual sealing system of this invention.
Figure 5:
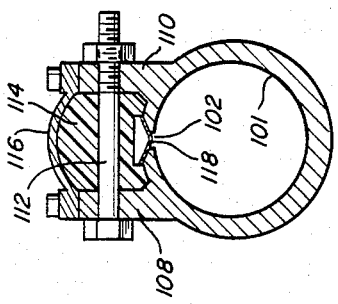
FIG. 5 is a cross-section view of the sphincter sealing system of FIG. 4 taken along the section line 5—5 in that figure.

FIGS. 4 and 5 show another embodiment of a sphincter which may be used in the dual seal system of this invention having a controllable bore achieved by mechanical radial displacement of the tube. The sphincter 100 is formed in the metal linear pocket feeder tube 101. A single axial slit 102 extends axially in the wall of the tube intermediate to but not through the tube ends 104 and 106 and defines the extent of the sphincter bore. Walls 108 and 110 surround the slit and are integral with but external of the tube, and bolts or other adjustable tensioning means 112 extend between the walls and across the slit. Elastomeric or deformable material 114 fills the space between the walls external to the slit. A deformable lid 116 is fastened to the tops of the walls 108 and 110 and extends across the top of the volume enclosed by the walls, and the lid 116 contains the filling material in the volume. In addition, a stiff strip 118 may be placed over the slit, between the tube and the filling material, in order to limit axial gas flow in the slit and prevent extrusion of the filling into the slit and interior of the tube 101.

The sphincter bore is contracted by tightening bolts 112 which deforms the tube. As is shown in FIG. 5, tube 101 is contoured externally so that the tube thickness varies about its circumference in order to provide nearly uniform contraction of the bore in a circular shape. The tube wall thickness is greatest 180° away from the slit 102 and diminishes uniformly toward the slit. Near the ends of the slit the tube must bend elastically to blend into the original shape or bore of the relatively very rigid ends 104 and 106 of the tube. This axial blending of bore of the tube from the original cross-section to the contracted size and back to the original size is desirable for guiding the pistons (not shown) of the conveyor into and out of the central region of the sphincter providing very small clearance.

Figure 6:
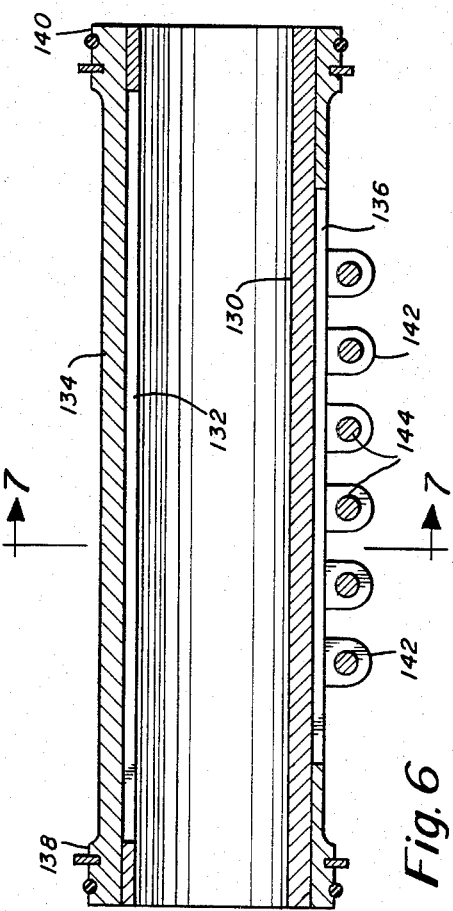
FIG. 6 is a cross-sectional view showing another embodiment of a sphincter sealing system of this invention.
Figure 7:
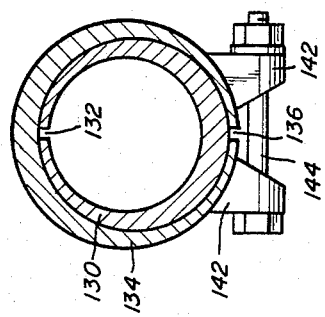
FIG. 7 is a cross-sectional view taken along section line 7—7 of FIG. 6.

FIGS. 6 and 7 show yet another embodiment of a sphincter having a controlled radial displacement for bore contraction. It includes an inner bore tube 130 having an axial slit 132 along its upper side. The outer diameter of inner tube 130 is eccentric with the bore, forming a peripheral cross section tapering down in thickness from a maximum displaced 180° from the slit 132 to the minimum at the slit. Tightly surrounding the bore tube 130 is a similarly slit outer tube 134 but the slit 136 in this tube extends axially along the bottom. The slit 136, like the slit 102 in the previous embodiment, does not extend to the ends 138 and 140 of the tube. The circumferential wall of the outer tube 134 is tapered toward its slit 136 in the same fashion as tube 130. Lugs 142 integral with the tube 134 and bolts 144 which span the slit 136, provide for peripheral contraction of both tubes 130 and 134 and, hence, the sphincter bore. Between the contacting surfaces of the two slit tubes, suitable grease, wax, or elastomeric materials can be used to both allow peripheral sliding and prevent gas and solids migration at the interface. As with the embodiment of FIGS. 2 and 3, it is evident that the systems of FIGS. 4 and 5 and FIGS. 6 and 7 may be formed as an integral part of or be incorporated into the main linear pocket feeder tube 24 of the major system and cooperate with the labyrinth seal between the pistons and tube to provide the desired seal in the system.

The liquid displacement and gas seal system shown in FIGS. 8 and 9 serves two functions:

It acts as a seal to prevent gas leakage from the high pressure unloading station 22 in the direction of travel of the chain 14, and it conserves energy by allowing thermodynamically required work to be minimized and performed efficiently.

The system, illustrated in FIGS. 8 and 9 includes:

1. At least one (and generally more than one) transfer tank 150 through which the pistons 12 travel;
2. A displacing liquid 152 which is denser than, less compressible than, more viscous than, and not overly miscible with the gas to be sealed;
3. A displacing liquid injection system 154 to supply displacing liquid to at least the first transfer tank 150a encountered by the pistons 12;
4. A level sensor system 156 which senses the level of displacing liquid 152 in each tank to which the injection system connects;
5. A "control system" to control the quantity of displacement liquid injected so as to maintain liquid level in each tank above the top of the pistons;
6. A gas collection and transfer system in the form of ducts 160 connected to the top of each tank 150 to collect displaced gas and transfer it where desired;
7. Baffles 162 and jets 164 to channel liquid flow in the tanks in such a manner as to clear the pockets 18 and chain 14 of any trapped gas bubbles;
8. Chain enclosures at the point of piston entry and exit in each tank, with piston-enclosure clearances or sealing means chosen to prevent significant liquid flow out of each tank other than that carried out between pistons; and
9. Rails or other guides 170 to guide piston travel from entry to exit in each tank 150 without substantially impeding gas or fluid flow. These may take the form of large cutouts in the tube 24 within each tank, or alternatively the tube 24 may be interrupted within each tank and guides may extend across the interruption to control the position of the pistons.

The displacement system shown in FIGS. 8 and 9 operates as follows. In FIG. 8, the pistons 12 move from left to right. As they enter the first tank from the unloading station 22, the pockets 18 between the pistons 12 are filled with high pressure gas. When the pockets are exposed to the liquid 152, the gas tends to rise out of the pockets and be replaced by liquid. The gas collects at the top of the tank 150, which is connected by pipe 160a through dryer 27 back to the unloading station 22. The level control system 156, by maintaining liquid level, ensures that the pressure in the first transfer tank 150a is just high enough to push all the collected gas through the pipe 160a into the unloading station. In practice the pressure in tank 150a is a few pounds per square inch greater than the unloading station pressure.

In practice, it is very difficult to collect all the gas in the first transfer tank 150a. Dissolved gas (which will come out of solution when the liquid is returned to atmospheric pressure) sets an upper bound on the percentage of input gas collected in the first tank 150a. Small bubbles of gas can be trapped in crevices and openings in the chain or carried in a wake of liquid behind the pistons; these bubbles can become a significant leak when they expand to atmospheric pressure. Dissolved and trapped gas can be collected by including the second transfer tank 150a as illustrated in FIG. 8.

The second transfer tank 150b operates similarly to the first tank 150a but with a few important differences. First, the pressure in the second tank 150b must be lower than in the first. This allows removal of dissolved gas and expansion (and easier collection) of trapped gas bubbles. Second, there is usually no need for liquid injection into the second tank. The rate of liquid addition (from the first tank, carried in the pockets) is equal to the rate of liquid removal by the exiting pockets. The second tank pressure is at or near atmospheric; thus, first-to-second-tank liquid leakage tends to be greater than second-tank-to-atmospheric leakage.

Figure 10:
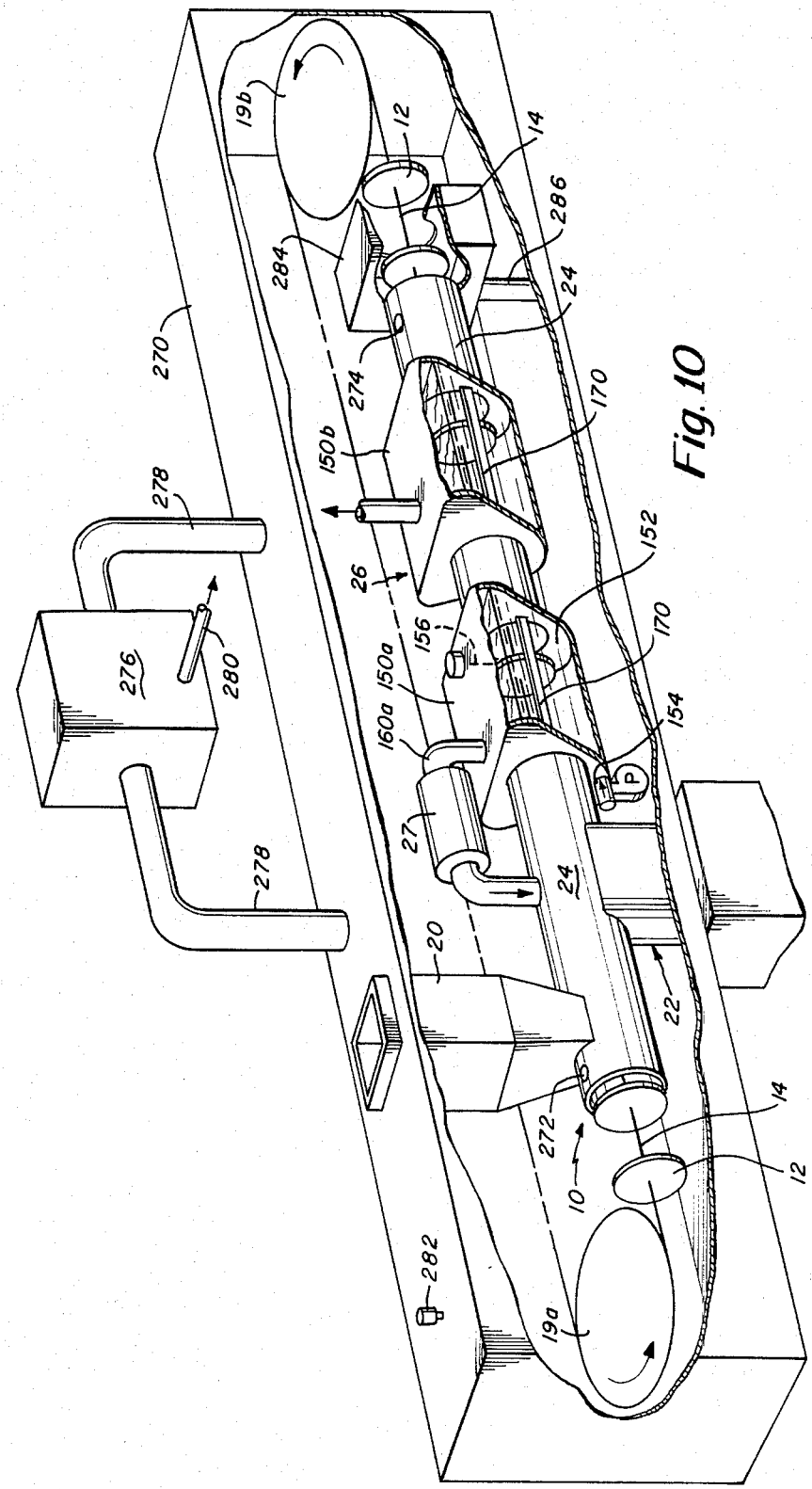
FIG. 10 is a schematic drawing of the linear pocket feeder of FIG. 1 showing one embodiment of the gas return for the liquid displacement and gas sealing system of FIG. 8.
Figure 11:
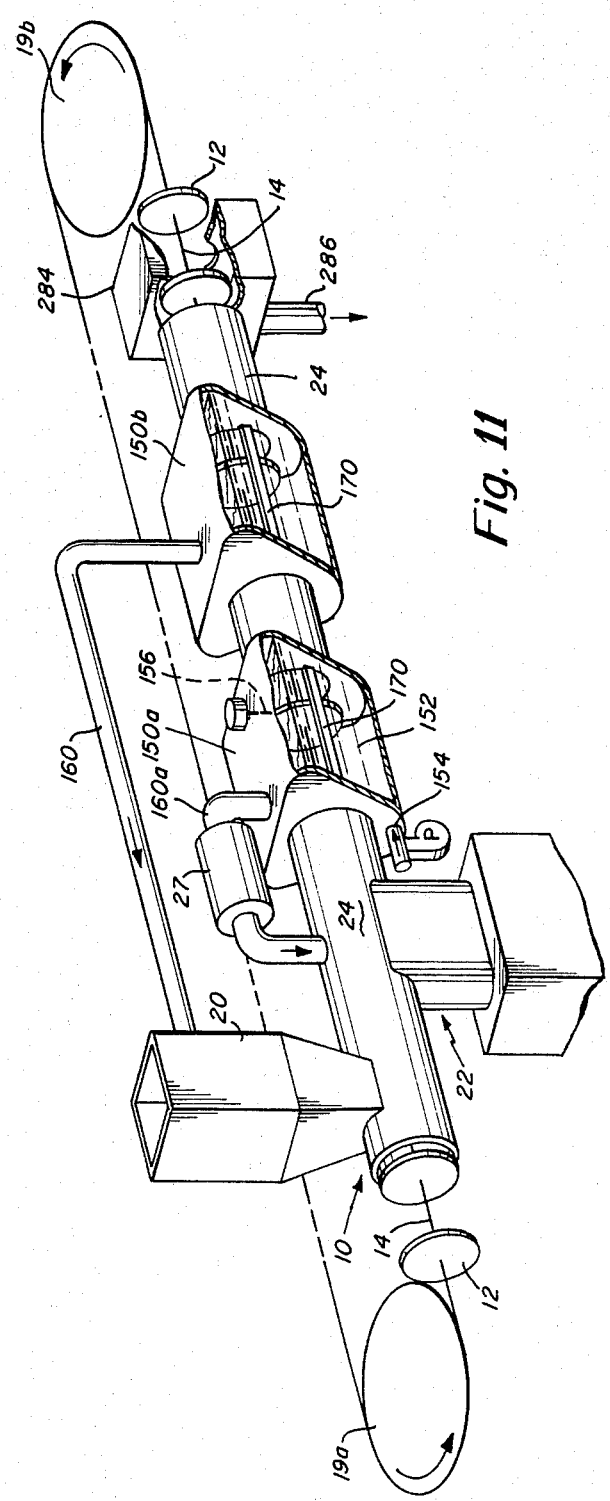
FIG. 11 is a schematic drawing of another embodiment of the gas return system for the liquid displacement and gas sealing system of FIG. 8.

The final major difference between the two tanks 150a and 150b is dictated by the lower pressure in the second tank. The second tank cannot be connected directly to the unloading station 22 for gas return. FIGS. 10 and 11 illustrate two alternative embodiments for the gas return from second tank 150b. In FIG. 10, the entire linear pocket feeder, including idler sprocket 19a and drive sprocket 19b and tube 24, is sealed by enclosure 270. Enclosure 270 is coupled to tube 24 upstream of hopper 20 by port 272 and is coupled to tube 24 downstream of station 26 by port 274. Hopper 20 extends through enclosure 270 to permit materials to be fed into tube 24, and hopper 20 is in sealing relationship with enclosure 270. A closed loop drying system is provided to strip the pistons and chain of any water carried over from the liquid displacement system. The gas in this enclosure 270 is circulated through a dryer 276 and returned to enclosure 270 by means of pipes 278. Liquid removed from the gas is discharged from dryer 276 through tube 280. This closed loop drying system maintains the sealed environment for enclosure 270. Thus, the enclosed linear pocket feeder is filled with the gas used for inerting the feed stock and transporting the materials from hopper 20 to the unloading station 22. Any gas not collected and transferred from the high pressure tank 150a to the unloading station 22 is transported into enclosure 270 and recirculated by the moving pockets to the input end of the feeder adjacent hopper 20. The pressure within the enclosure 270 is maintained at a low value, and safety valves 282 may be provided for venting the enclosure if the pressure exceeds a predetermined value.

In an alternative embodiment, as shown in FIG. 11, pipe 160 may run directly to a low pressure point, such as to hopper 20, so that the gas collected within tank 150b is returned to a low pressure point in the input side of the feeder. Pipe 160 is maintained in sealing relationship with hopper 20 so that the system is closed.

Once the pistons 12 have passed through tank 150b, they exit through a sealed portion of tube 24 and enter a liquid discharge station 284 at which the liquid within the pockets is removed and discharged through tube 286 to a reservoir for supplying the liquid to tanks 150a and 150b.

It will be noted in FIG. 9 that the tanks 150 are essentially triangular in cross section with the side walls 171 and 172 converging downwardly toward one another so that the top of the tank is wider than the bottom. Since any liquid below the pistons 12 in tanks 150 does not contribute directly to system operation, the pistons generally travel through the bottom portion of the tank. Tanks 150a and 150b may have any cross-sectional configuration in which the volume above the pistons is much larger than the volume through which the pistons travel, and a triangular configuration serves this purpose.

The small cross-sectional area of the tanks (in a plane perpendicular to piston travel) provided by the triangular configuration is desirable in the portion of the tanks through which the pistons 12 travel. Should liquid level drop too low in the tank 150, a small control action (increasing liquid injection) can raise the level quickly. It also eases the difficulty of tailoring fluid flow to minimize bubble entrapment in piston wakes.

In the portion of the tank above the pistons, a large cross-section is desirable. In such a volume, the liquid level is insensitive to liquid injection controller errors. The reserve volume of liquid is also large enough that, should the liquid injection system fail, more time is provided to react (e.g. shut down the linear pocket feeder) before the liquid level drops to the point where gas leakage begins.

As noted earlier, the sealing liquid 152 must be more dense than, more viscous than, less compressible than, and not significantly miscible with the gas to be sealed. It should also be less noxious than the gas, relatively cheap, and easily available. Water is an obvious and usually excellent choice. Addition of various chemicals may be necessary for corrosion prevention, etc.

Gas is collected in the top of each tank 150 by its natural rising tendency and the enclosed tank top. An outlet is provided by the ducts 160 to the place to which the gas is to be transferred. The level control 156 and liquid injection system 154 may automatically force the transfer tank pressure to be just high enough to force all the collected gas through the outlet 160. In the case where the gas is being forced from the first transfer tank to the unloading station, this corresponds to only a few pounds per square inch above unloading station pressure.

To maximize the efficiency of each transfer tank, some tailoring of internal flow patterns is used. The liquid inlet 154 and tank design are best arranged so the liquid 152 supplied to the tank 150 moves with and at about the same velocity as the pistons 12. This reduces the number of bubbles carried in any wake behind the pistons. Liquid jets 164 are also desirable, pointing generally perpendicular to chain motion, to clear bubbles out of any crevices or openings in the chain and "sweep out" bubbles from the piston wakes.

In FIGS. 8 and 9 it will be noted that a portion of the inlet fluid is injected through small holes or jets 164 in the side of the inlet pipe 180 to start the clearing of gas from the pockets 18. Most of the fluid enters the tank 150 through the end 182 of the inlet pipe 180, parallel to chain motion and close to the speed of the chain. The baffles 162 force the inlet liquid to flow mostly upward into the pockets. This upward motion aids the rising of the gas bubbles.

The points where the conveyor exits and enters each transfer tank 150 must provide some seal to prevent excess fluid loss. If excess fluid leaks out of the tube 24, efficiency suffers. If multiple transfer tanks are used, leakage between tanks may make it impossible to maintain the decrease in pressure required as pistons travel from one tank to another. If this pressure decrease is not maintained, the different tanks do not act as separate tanks.

In practice, sufficiently efficient seals can generally be maintained by ensuring that the piston-to-enclosure clearance is small. The liquid viscosity and the fact that initial transfer tank pressure is very near unloading station pressure makes such seals adequate.

It is often easiest to fabricate the entry/exit enclosures and internal chain guidance system as one unit, e.g., a single tube with cutouts or holes for liquid inlet and gas exit. It is advantageous to arrange the openings so that the initial opening encountered by a piston is on the bottom of the piston. Then, as a pocket encounters this opening, the first action is that of liquid entering the pocket from the bottom. This slightly pre-pressurizes the pocket. Then, when the pocket reaches the top opening out of which gas can escape, the gas is driven out and liquid continues to enter the still-open bottom. This minimizes interference with gas removal by liquid spilling into the pocket through a top opening. To satisfy these design requirements, it will be noted in FIG. 8 that the top of the tube 24 where each tube section enters into the tanks 150a and 150b extends beyond the bottom of the tube.

Modifications and improvements will occur within the scope of this invention and the above description is intended as exemplary only. The scope of this invention is defined by the following claims and their equivalents.

What is claimed is:

1. An improved linear pocket feeder for introducing granular solids into a vessel containing pressurized gas comprising:

a sealed conveying tube;

a plurality of pistons slidable within the tube and connected together to form pockets therebetween, said pistons being in sealing and slidable engagement with the interior surfaces of the tube to form a moving labyrinth seal;

means for feeding the granular solids to the pockets;

an unloading station for depositing the granular solids into the pressurized vessel;

means for driving the pistons through the tube in a desired direction of movement to transport the granular solids from said feeding means to said unloading station;

means disposed between said feeding means and said unloading station for adjusting the diameter of the interior of said tube to provide a contact seal between said pistons and the interior surfaces of said tube;

means including a chamber through which said pistons and pockets move and disposed downstream from said unloading station with respect to the direction of movement of said pistons for displacing the gas within said pockets by a liquid;

means for collecting the displaced gas; and means for conveying the displaced gas from said collecting means to a point in the linear pocket feeder upstream of said displacing means with respect to said direction of movement of said pistons.

2. An improved linear pocket feeder for introducing granular solids into a vessel containing pressurized gas, the feeder having a sealed conveying tube, a plurality of pistons slidable within the tube and connected together to form pockets therebetween, means for feeding the granular solids to the pockets, an unloading station for depositing the granular solids into the pressurized vessel, means for driving the pistons through the tube to transport the granular solids from the feeding means to the unloading station and provide labyrinth seals between the pistons and the interior of the tube upstream of the unloading station, wherein the improvement comprises means for adjusting the diameter of the interior of said tube upstream of the labyrinth seal to provide contact between said pistons and the interior surfaces of said tube to form a desired contact seal upstream of the labyrinth seal; said adjusting means including an axially-extending slit formed in one wall of said tube;

means for varying the width of said slit; and a generally rigid strip disposed on the exterior of said tube and covering said slit for preventing contents of said pockets from passing through said slit.

3. An improved linear pocket feeder as recited in claim 2 wherein said varying means comprises:
 a pair of generally parallel, spaced external walls, said walls being disposed on opposite sides of said slit in confronting relationship; and
 means for adjusting the spacing between said walls.

4. An improved linear pocket feeder for introducing granular solids into a vessel containing pressurized gas, the feeder having a sealed conveying tube, a plurality of pistons slidable within the tube and connected together to form pockets therebetween, means for feeding the granular solids to the pockets, an unloading station for depositing the granular solids into the pressurized vessel, means for driving the pistons through the tube to transport the granular solids from the feeding means to the unloading station and provide labyrinth seals between the pistons and the interior of the tube upstream of the unloading station, wherein the improvement comprises
 means for adjusting the diameter of the interior of said tube upstream of the labyrinth seal to provide contact between said pistons and the interior surfaces of said tube to form a desired contact seal upstream of the labyrinth seal; said adjusting means including
 an axially-extending slit formed in one wall of said tube;
 a pair of generally parallel, spaced external walls, said walls being disposed on opposite sides of said slit in confronting relationship;
 means for adjusting the spacing between said walls for varying the width of said slits;
 a deformable lid disposed between said pair or walls covering said slit in spaced relationship therewith; and
 a deformable sealing material disposed between said lid and said slit and between said walls externally of said tube.

5. An improved linear pocket feeder for introducing granular solids into a vessel containing pressurized gas, the feeder having a sealed conveying tube, a plurality of pistons slidable within the tube and connected together to form pockets therebetween, means for feeding the granular solids to the pockets, an unloading station for depositing the granular solids into the pressurized vessel, means for driving the pistons through the tube to transport the granular solids from the feeding means to the unloading station and provide labyrinth seals between the pistons and the interior of the tube upstream of the unloading station, wherein the improvement comprises
 means for adjusting the diameter of the interior of said tube upstream of the labyrinth seal to provide contact between said pistons and the interior surfaces of said tube to form a desired contact seal upstream of the labyrinth seal; said adjusting means including
 an axially-extending slit formed in one wall of said tube;
 means for varying the width of said slit;
 means for preventing contents of said pockets from passing through said slit; and
 said tube having a thickness which increases away from said slit, the portion of the wall of said tube having the greatest thickness being disposed directly opposite of said slit.

6. An improved linear pocket feeder for introducing granular solids into a vessel containing pressurized gas, the feeder having a sealed conveying tube, a plurality of pistons slidable within the tube and connected together to form pockets therebetween, means for feeding the granular solids to the pockets, an unloading station for depositing the granular solids into the pressurized vessel, means for driving the pistons through the tube to transport the granular solids from the feeding means to the unloading station and provide labyrinth seals between the pistons and the interior of the tube upstream of the unloading station, wherein the improvement comprises
 means for adjusting the diameter of the interior of said tube upstream of the labyrinth seal to provide contact between said pistons and the interior surfaces of said tube to form a desired contact seal upstream of the labyrinth seal; said adjusting means including
 an axially-extending slit formed in one wall of said tube;
 means for varying the width of said slit;
 a second tube surrounding said tube, said second tube having an axially extending slot disposed in non-aligned relation with said slot of said tube, the outer surface of said tube being in contact with the inner surface of said second tube;
 means for contracting the diameter of said second tube to contract the diameter of said tube by reducing the width of said slit in said tube; and means for lubricating the contact between the outer surface of said tube and the inner surface of said second tube.

7. An improved linear pocket feeder for introducing granular solids into a vessel containing pressurized gas, the feeder having a sealed conveying tube, a plurality of pistons slidable within the tube and connected together to form pockets therebetween, means for feeding granular solids to the pockets, an unloading station for depositing the granular solids from the pockets into the pressurized vessel, means for driving the pistons through the tube in a desired direction of movement to transport the granular solids from the feeding means to the unloading station, wherein the improvement comprises:
 at least one transfer tank disposed downstream from said unloading loading station with respect to the direction of movement of said pistons and through which the pistons and pockets travel;
 a displacing liquid disposed within said transfer tank, said displacing liquid being less compressible than and more viscous than the gas disposed in said vessel;
 means for supplying said displacing liquid to said transfer tank;
 means for collecting gas displaced from said pockets by said displacing liquid;
 means for conveying the displaced gas from said collecting means to said unloading station; and
 means for maintaining a higher gas pressure in said transfer tank than in said unloading station.

8. An improved linear pocket feeder as recited in claim 7 wherein said improvement further comprises a second transfer tank disposed downstream of said one transfer tank with respect to the direction of movement of said pistons.

9. An improved linear pocket feeder as recited in claim 7 or 8 further comprising means for maintaining the level of said displacing liquid at a height such that the pistons are entirely covered by said displacing liquid when passing through said transfer tank.

10. An improved linear pocket feeder as recited in claim 8 wherein the gas pressure within said second tank is lower than the gas pressure within said one tank.

11. An improved linear pocket feeder as recited in claim 8 wherein said one tank and said second tank have a generally triangular cross-sectional shape, said pistons passing through one corner of said triangular cross section.

12. An improved linear pocket feeder as recited in claim 8 further comprising:
   means in said second transfer tank for displacing gas from within said pockets into said second transfer tank; and
   means for conveying gas displaced in said second transfer tank to a low pressure point in the linear pocket feeder upstream of said unloading station with respect to said direction of movement of said pistons.

13. An improved linear pocket feeder as recited in claim 12 wherein said collecting and conveying means transports the displaced gas to said feeding means.

14. An improved linear pocket feeder as recited in claim 8 further comprising:
   a sealed enclosure surrounding said linear pocket feeder, said one transfer tank and said second transfer tank;
   means in said second transfer tank for displacing gas from within said pockets into said second transfer tank; and
   means for conveying the gas displaced in said second transfer tank from the interior of said second transfer tank into the interior of said enclosure outside of said second transfer tank for return of the displaced gas to a point in said sealed conveying tube upstream of said feeding means.

15. An improved linear pocket feeder as recited in claim 8 wherein said one tank and said second tank each comprise a lower portion having a relatively narrow cross-sectional dimension and an upper portion having a cross-sectional dimension much greater than that of said lower portion, said tube containing said pistons being disposed in said lower portion and being completely immersed in said displacing liquid.

16. An improved linear pocket feeder as recited in claim 7 further comprising baffle means and jet means for chanelling liquid flow within said one tank to expel gas from within said pockets.

* * * * *